J. DANA.
Cotton-Seed Planters.

No. 148,186. Patented March 3, 1874.

Witnesses:
Rice M. Brown
Elihu S. McIntire

Inventor:
Joseph Dana

UNITED STATES PATENT OFFICE.

JOSEPH DANA, OF MITCHELL, INDIANA.

IMPROVEMENT IN COTTON-SEED PLANTERS.

Specification forming part of Letters Patent No. 148,186, dated March 3, 1874; application filed February 23, 1874.

*To all whom it may concern:*

Figure 1:
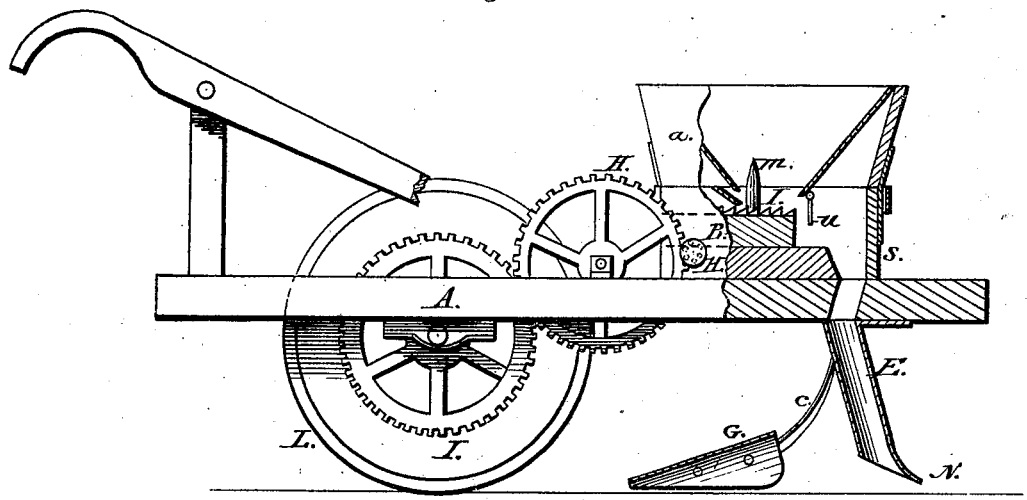
Figure 2:
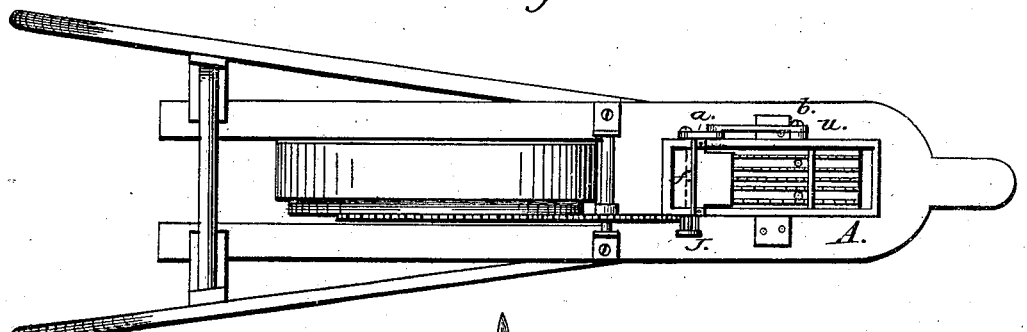
Figure 3:
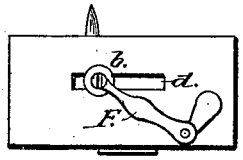

Be it known that I, JOSEPH DANA, of Mitchell, Lawrence county and State of Indiana, have invented a Machine for Planting Cotton-Seed, of which the following is a specification:

Figure 1 is a side view, partly in section. Fig. 2 is a plan view. Fig. 3 is a detail view.

This invention relates to a machine for planting cotton-seed; and consists in the combination of devices for insuring the delivery of the seed from the hopper to the discharge-spout, as will be hereinafter explained.

To the front of a rectangular frame, A, is secured a hopper, S. Within this hopper a block of wood, H, is placed, upon which a reciprocating slide, B, moves. The upper surface of this slide is provided with a series of notched or serrated bars embedded therein, which carry the seed forward to the discharge-spout. Above the discharge-spout, and over the slide, is arranged a valve, U, which prevents the adhering seed from being carried back with the slide. Beneath the discharge-opening in the hopper is attached a seed-delivering spout, E, the lower end of which is formed into an opener, N. In rear of the discharge-spout is the coverer G, attached by spring-arms $c\ c'$ to the under side of the frame A. The feed-slide receives its movement from a crank-arm, $a$, which is attached at one end to a pin, $b$, upon the feed-slide, which travels in a slot, $d$, in the side of the hopper. The other end of the crank-arm is attached to a pitman, F, which is operated by a shaft, $f$, passing through the rear end of the hopper, upon which is arranged a cog-wheel, J, operated through the medium of the gear-wheels H and I, one of which is attached to the side of the ground-roller L. Between the serrated or notched teeth are placed upright pins $m$, which serve as agitators and to aid in the delivery of the seed.

Having thus fully described my invention, what I claim as new, and desire to secure by Letters Patent, is—

The seed-slide provided with the serrated or notched feeders, in combination with the valve U and upright pins $m$, for insuring the delivery of the seed, as described.

JOSEPH DANA.

Witnesses:
 RICE M. BROWN,
 ELIHU S. MCINTIRE.